(12) United States Patent
Czyzewski et al.

(10) Patent No.: US 12,261,421 B2
(45) Date of Patent: Mar. 25, 2025

(54) BUSHING WITH ELECTRICALLY CONDUCTIVE HEAD MOUNTED ON CONDENSER CORE

(71) Applicant: Hitachi Energy Ltd, Zürich (CH)

(72) Inventors: Jan Czyzewski, Cracow (PL); Krzysztof Kasza, Cracow (PL); Jedrzej Banaszczyk, Lodz (PL); Andrzej Rybak, Cracow (PL); Lukasz Matysiak, Cracow (PL)

(73) Assignee: Hitachi Energy Ltd, Zürich (CH)

( * ) Notice: Subject to any disclaimer, the term of this patent is extended or adjusted under 35 U.S.C. 154(b) by 180 days.

(21) Appl. No.: 17/798,180

(22) PCT Filed: Feb. 24, 2021

(86) PCT No.: PCT/EP2021/054499
§ 371 (c)(1),
(2) Date: Aug. 8, 2022

(87) PCT Pub. No.: WO2021/170611
PCT Pub. Date: Sep. 2, 2021

(65) Prior Publication Data
US 2023/0071110 A1 Mar. 9, 2023

(30) Foreign Application Priority Data
Feb. 24, 2020 (EP) .................................... 20158983

(51) Int. Cl.
*H02G 15/103* (2006.01)
*H01G 4/242* (2006.01)
(Continued)

(52) U.S. Cl.
CPC .......... *H02G 15/046* (2013.01); *H01G 4/242* (2013.01); *H01G 4/32* (2013.01); *H02G 15/003* (2013.01)

(58) Field of Classification Search
CPC ..... H01R 13/53; H02G 15/103; H02G 15/184
(Continued)

(56) References Cited

U.S. PATENT DOCUMENTS

| 2,650,334 A | * | 8/1953 | Skeats | H01G 4/35 |
| | | | | 333/99 R |
| 3,513,253 A | * | 5/1970 | Woods | H01B 17/28 |
| | | | | 264/262 |

(Continued)

FOREIGN PATENT DOCUMENTS

| CN | 101836269 A | 9/2010 |
| EP | 2800112 A1 | 11/2014 |
| EP | 3148027 A1 | 3/2017 |

OTHER PUBLICATIONS

Office Action and Search Report, Chinese Patent Application No. 2021800162019, mailed Feb. 17, 2023, 5 pages.
(Continued)

*Primary Examiner* — Chau N Nguyen
(74) *Attorney, Agent, or Firm* — Sage Patent Group

(57) ABSTRACT

The present disclosure relates to a bushing including an electrical conductor comprising a terminal at a first end of the bushing. The bushing also includes an electrically insulating condenser core arranged around the conductor and defining a central longitudinal through-hole through which the conductor extends. The bushing also includes a plurality of concentric field-grading layers arranged in the condenser core, comprising an inner field-grading layer and an outer field-grading layer. The bushing also includes an electrically conductive head electrically connected with the conductor passing there through, forming a gas-tight cap of the first end of the bushing outside of the condenser core, sealingly engaging a circumferential lateral outer surface of the condenser core and sealingly engaging the conductor. The bushing also includes an electrically conductive connection between the inner field-grading layer and the head.

10 Claims, 7 Drawing Sheets

(51) Int. Cl.
　　　*H01G 4/32*　　　(2006.01)
　　　*H02G 15/00*　　　(2006.01)
　　　*H02G 15/04*　　　(2006.01)

(58) Field of Classification Search
　　　USPC ........................................................ 174/73.1
　　　See application file for complete search history.

(56) References Cited

U.S. PATENT DOCUMENTS

| | | | | |
|---|---|---|---|---|
| 3,588,319 | A | * | 6/1971 | Isogai et al. ........... H01B 17/28 |
| | | | | 174/31 R |
| 4,500,745 | A | | 2/1985 | Miggins |
| 5,206,780 | A | * | 4/1993 | Varreng ................... H01C 7/12 |
| | | | | 361/91.1 |
| 2018/0219369 | A1 | * | 8/2018 | Czyzewski .............. H01B 7/02 |

OTHER PUBLICATIONS

International Search Report and Written Opinion of the International Searching Authority, PCT/EP2021/054499, mailed May 3, 2021, 16 pages.

Zhou Dan, et al. "Experience Gained in Fault Diagnosis and Tear-Down Analysis of Transformer Bushings", 2019 IEEE $3^{rd}$ International Electrical and Energy Conference, Sep. 7, 2019 (XP033763545), 4 pages.

Extended European Search Report, European Patent Application No. 20158983.5, mailed Jul. 20, 2020, 8 pages.

* cited by examiner

BUSHING WITH ELECTRICALLY CONDUCTIVE HEAD MOUNTED ON CONDENSER CORE

CROSS REFERENCE TO RELATED APPLICATIONS

This application is a 35 U.S.C. § 371 national stage application of PCT International Application No. PCT/EP2021/054499 filed on Feb. 24, 2021, which in turn claims foreign priority to European Patent Application No. 20158983.5, filed on Feb. 24, 2020, the disclosures and content of which are incorporated by reference herein in their entirety.

TECHNICAL FIELD

The present disclosure relates to a bushing, especially a high-voltage (HV) bushing.

BACKGROUND

A HV bushing serves to direct electric current under high voltage through a wall of on an enclosure of an electric device. Its main functions are to:
- electrically insulate the HV conductor of the bushing from the enclosure wall,
- dissipate heat generated by the current so that the insulator is not overheated,
- provide gas and/or liquid tight connection between the conductor and the enclosure,
- withstand mechanical forces applied to the conductor and/or the enclosure Draw-lead-conductor and removable-rod-conductor type bushings are insulators having an inner central channel typically defined by a winding tube through which the conductor can be pulled when installing the bushing. When installed in a metallic winding tube, along the major part of its length, the conductor has to be electrically insulated to avoid circulating currents and/or sparking at the conductor. In such a case, the conductor, typically flexible, has to be covered by an insulation material, e.g. paper wrapping, before leading it through the tube. For stiff conductors, like solid rods, electrically insulating distance sleeves can be used to physically separate the conductor outer surface from the inner surface of the tube. Another solution is to make the inner central channel electrically insulating. This second solution has the advantage that a fully metallic conductor can be introduced into the central channel and its diameter can be almost as large as that of the channel. The large diameter of the conductor makes its electric resistance smaller and also improves the thermal contact of the conductor to the bushing insulator which both allow for increasing the current rating value of the bushing.

An example prior art bushing is shown in FIG. 1. The bushing P1 has a winding tube P4 connected to the HV terminal P3. The tube P4 is partly embedded in the material of the condenser core P5 of the bushing. The high-voltage terminal P3 of the conductor P2 provides the electrical contact between the conductor P2 and the tube P4. The tube P4 is electrically connected to the innermost of the HV field grading layers P6 of the bushing. The condenser core P5 is made of a curable resin which, when curing, binds tightly to the outer surface of the tube P4. The bushing P1 also comprises a flange P8 for fastening the bushing to the wall through which it is to extend, and an external insulator P7 with weather sheds.

The external insulator P7 is made of an elastomeric material bound directly to the condenser core P5, which is referred further to as a directly-moulded bushing style.

The gas and liquid tightness of the bushing is provided:
- at the outer perimeter of the condenser core, by a fixing and sealing system of the flange P8;
- at the inner perimeter of the condenser core, by the winding tube P4 fit against the material of the condenser core P5 (the condenser core is made by casting polymeric resin which is hardened at high temperature and, when shrinking during cooling, contracts around the winding tube, thus providing the tight and durable fit);
- at the top of the bushing, by the terminal P3 fixing and sealing system to the winding tube P4.

This solution has the following disadvantages:
For bushings P1 with the resin of the condenser core P5 hardened at high temperature, the thermal shrinkage of the resin generates mechanical stresses which are particularly concentrated at the lower end of the winding tube P4. The stresses can lead to cracks in the condenser core P5. This can happen particularly at low ambient temperatures, when the shrinkage of the resin is the largest.

For bushings P1 with the resin hardened at lower temperatures, the thermal shrinkage is small. However, when the bushing operates in high ambient temperature or in an overload condition, the winding tube P4 can reach a temperature higher than the resin hardening temperature. Then the resin expands more than the tube and a gap can open between the tube and the condenser core P5, thus compromising the gas/liquid tightness of the bushing.

Alternatively, a bushing can be made with a fixed conductor, permanently cast within the cured resin of the condenser core. Similar to the solution with the winding tube, the gas and liquid tightness of the interface between the conductor and the condenser core is provided by the shrinkage of the resin over the conductor when cooled down from the curing temperature to room temperature. In such cases, if a condenser core is hardened at low temperature, the tightness of the bushing can be compromised at high temperatures when the condenser core expands more than the conductor and a gap opens between the two.

U.S. Pat. No. 1,230,610 discloses a high-potential insulating bushing having a condenser and a top metal cap which is sealed against the conductor by means of a packing gasket. A similar packing gasket also seals the bottom of the bushing.

GB 929 579 discloses a high-voltage insulating lead-in bushing where the top is closed by a metal cap which is sealed around the conductor by a sealing ring. A similar sealing ring also seals the bottom of the bushing. EP 3 148 027 A1 discloses a rigid conical insulator configured as a condenser core. The condenser core comprises an electrically conductive central tube and a high-voltage current terminal is configured as metal fitting and is mechanically fixed and electrically connected to the end of the central tube by means of screwing.

SUMMARY

It is an objective of the present disclosure to provide an alternative bushing design which does not require a winding tube.

According to an aspect of the present disclosure, there is provided a bushing comprising an electrical conductor comprising a terminal at a first end of the bushing. The bushing also comprises an electrically insulating condenser core arranged around the conductor and defining a central longitudinal through-hole through which the conductor extends. The bushing also comprises a plurality of concentric field-grading layers arranged in the condenser core, comprising an inner field-grading layer and an outer field-grading layer. The bushing also comprises an electrically conductive head electrically connected with the conductor passing there through, forming a gas-tight cap of the first end of the bushing outside of the condenser core, sealingly engaging a circumferential lateral outer surface of the condenser core and sealingly engaging the conductor. The bushing also comprises an electrically conductive connection between the inner field-grading layer and the head.

By sealing the head against the outside of the condenser core, the first end of the bushing can be made gas tight without the need for a winding tube. The gas tightness implies that e.g. humidity is prevented from entering the bushing and thus to within the enclosure of an electrical device, a wall of which the bushing is configured to pass through. Also, by the head being electrically connected to both the conductor and the inner field-grading layer, the head and the inner filed-grading layer can be held at the same electrical potential as the conductor, preventing flash-overs between the inner field-grading layer and the conductor.

In some embodiments of the present disclosure, the condenser core is unconstrained at the second end of the bushing, allowing the condenser core to expand and contract freely with changing temperature, reducing stresses and thus the risk of crack formation.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
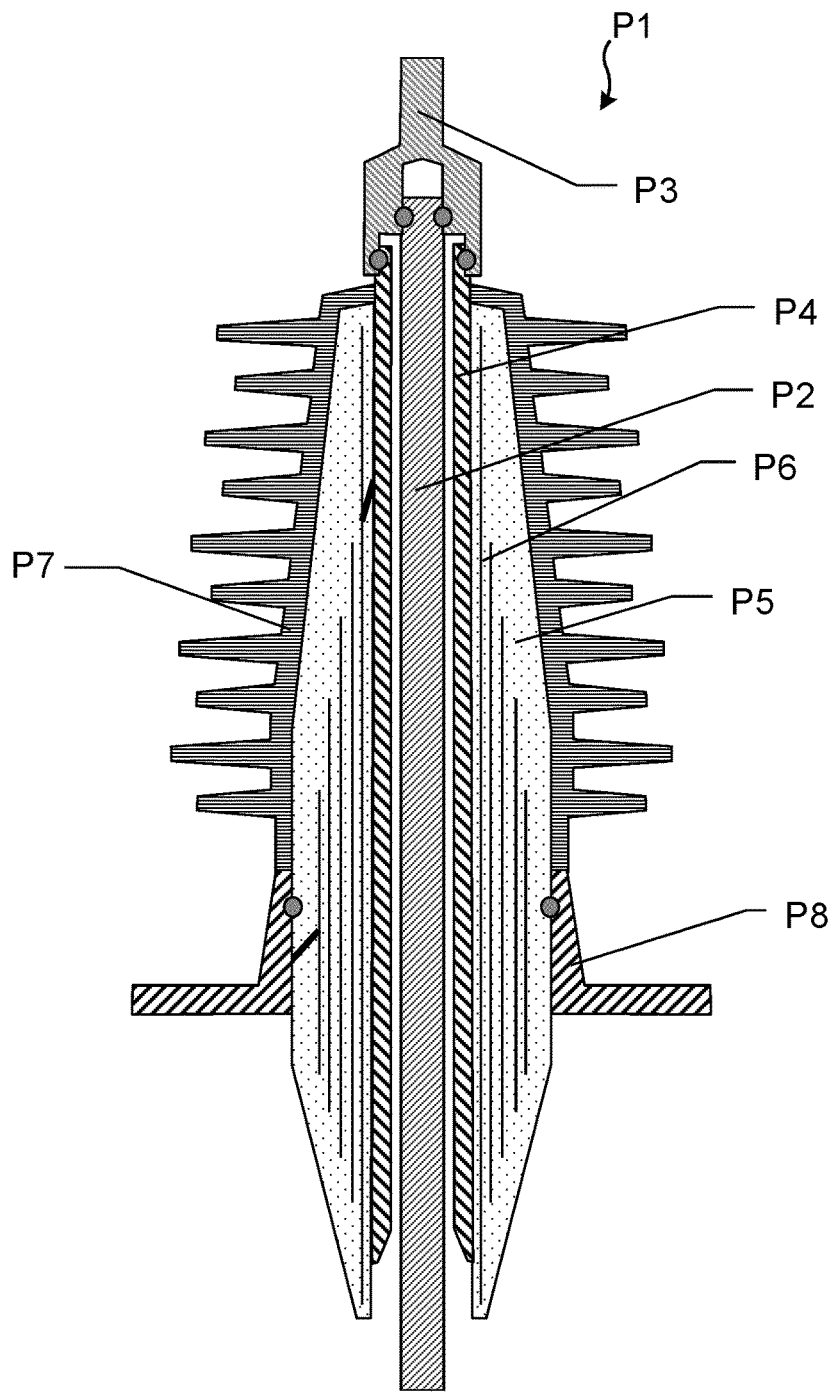
FIG. 1 is a schematic illustration of a HV bushing according to prior art.
Figure 2:
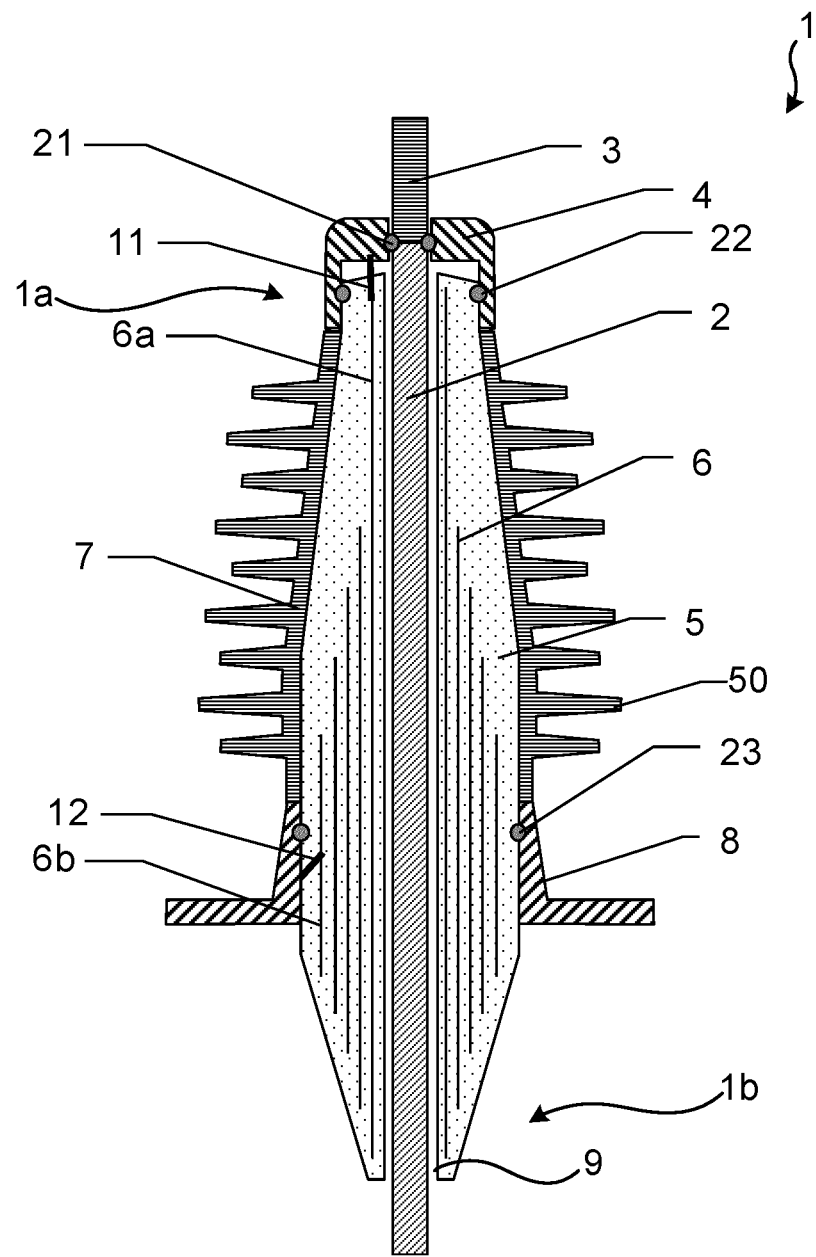
FIG. 2 is a schematic side view, in longitudinal section, of a bushing, in accordance with an embodiment of the present disclosure.

FIG. 2 illustrates a bushing 1 having a conductor 2 comprising the HV terminal 3. The condenser core 5 of the bushing is arranged around the conductor 2, forming a central longitudinal through-hole 9 through which the conductor extends. The condenser core 5 is typically substantially rotationally symmetrical and typically concentric with the longitudinal through-hole 9.

The condenser core 5 may be manufactured such that the inner surface of the through-hole 9 in the condenser core is electrically insulating. This may be accomplished e.g. by manufacturing by winding and/or casting the condenser core on a mandrel, the mandrel being withdrawn after hardening of the resin (e.g. Resin Impregnated Paper, RIP, or Resin Impregnated Synthetic, RIS, bushing, depending on whether the wound material is paper or a synthetic material, e.g. aramid based). Alternatively, the condenser core 5 may be manufactured by casting the resin around a thin-wall electrically insulating tube, e.g. a glass-fibre epoxy tube, which is not withdrawn but remains in the bushing when in use. As yet another alternative, the condenser core 5 may be formed by winding and/or casting directly on the conductor 2, in which case the conductor may not be removable from the longitudinal through-hole 9, in contrast to if e.g. a mandrel or insulating tube is used. The curable resin used for casting and/or impregnating the wound material may be, or comprise, an epoxy or phenolic resin, usually epoxy.

The longitudinal through-hole 9 runs through the whole length of the condenser core 5. An electrically conductive head 4 is electrically connected with the conductor 2 and attached to the condenser core at the first end 1a of the bushing 1 (typically at an upper end of the bushing when in use), where the head 4 forms a gas-tight cap of the first end 1a outside of the condenser core 5, sealingly engaging a circumferential lateral outer surface of the condenser core 5 and sealingly engaging the conductor 2. The electrically conductive head 4 may sealingly engage the condenser core 5 and/or the conductor 2 by being pressed against it to form a gas tight fit between the head and the condenser core. For instance, the head 4 and/or the outer surface of the condenser core 5 may be slightly tapered to facilitate forming a gas tight seal when the head is pressed onto the condenser core. Alternatively, a sealing system 22 of the head 4 may be applied against the condenser core 5. Similarly, in some embodiments, a conductor sealing system 21 of the head may be applied against the conductor 2. A flange 8 of the bushing 1 may similarly sealingly engage the outside of the condenser core 5 to prevent e.g. moisture to leak into the electrical equipment. Optionally, a flange sealing system 23 may be used between the condenser core 5 and a flange 8 configured for attaching the bushing to a wall through which the bushing is arranged to extend when in use, e.g. a wall of an electrical equipment, e.g. a high-voltage (HV) equipment such as a transformer, motor, switchgear, generator or reactor. Typically, such an electrical equipment may be filled with an electrically insulating fluid, e.g. a liquid such as an oil (typically mineral oil) or ester liquid, or a gas such as $SF_6$.

Any one or several of the sealing systems 21 and 22 may e.g. comprise or consist of one or more O-rings and may be combinable with gas tight fit between the head and the condenser core and/or with a locking system (see FIG. 3) e.g. comprising a curable compound or glue. The head and/or conductor sealing systems 22 and 21 may aid in making the head 4 a gas-tight cap on the condenser core at the first end 1a of the bushing 1, preventing moisture to enter the enclosure of the electrical device and e.g. contaminating the electrically insulating fluid or its other parts.

At the second end 1b of the bushing (typically the lower end of the bushing when in use), the condenser core 5 is preferably unconstrained, implying that it is free to expand or contract. For instance, the condenser core may contract during curing at manufacture, or it may expand due to being immersed in the electrically insulating fluid. Thus, stresses and cracks in the condenser core are prevented. The condenser core is e.g. not pressed between the head 4 and any cap or other constraining locking arrangement at the second end 1b of the bushing. Further, the second end 1b of the bushing 1 may be open to allow any electrically insulating fluid to enter the central longitudinal through-hole 9, e.g. for facilitating mounting of the bushing to an electrical equipment.

The conductor 2 comprises a terminal 3, e.g. a HV terminal, extending outside of the condenser core 5 at the first end is of the bushing 1. The terminal 3 provides the electrical connectivity between the conductor 2 and a further conductor which is external to the bushing. As mentioned above, the head 4 is electrically connected with the conductor 2, e.g. to the terminal 3 thereof. The head is thus made of an electrically conductive material, e.g. a metal or alloy such as a cupper (Cu) and/or aluminium (Al) alloy. Further, the head 4 is electrically connected, by means of an electrically conductive connection 11, to an inner 6a of a plurality of the field grading layers 6 in the condenser core 5. The field-grading layers 6, e.g. of aluminium (Al) foils, are typically conventionally arranged concentrically with respective different diameters within the condenser core, e.g. interleaved between layers of a wound material thereof. By the head 4 being electrically connected to both the conductor 2 and the inner field-grading layer 6a (typically the innermost field-grading layer), the head and the inner filed-grading layer can be held at the same electrical potential as the conductor, preventing flash-overs between the inner field-grading layer and the conductor. Similarly, an outer field-grading layer (typically the outermost field-grading layer) may be electrically connected, by means of an electrically conductive connection 12, to the (possibly grounded) flange 8.

The bushing 1 may also comprise an external insulator 7, arranged outside of the condenser core 5 and typically comprising weather sheds 50. The external insulator 7 may be cast or extruded over the outer surface of the condenser core 5 and may be bound e.g. to the condenser core, to the head 4 and/or to the flange 8. Bonding may be accomplished by a chemical reaction between a reactive elastomeric compound, e.g. liquid silicone rubber, of the external insulator and the respective surfaces of the condenser core, the flange and/or the head at the areas where they contact the external insulator. Additional gluing material may additionally or alternatively be used for binding the external insulator 7 to the condenser core, the flange and/or the head.

FIGS. 3-6 illustrate some example embodiments of a bushing 1, to which the above discussion relating to FIG. 2 is relevant except where otherwise specified below.

Figure 3:
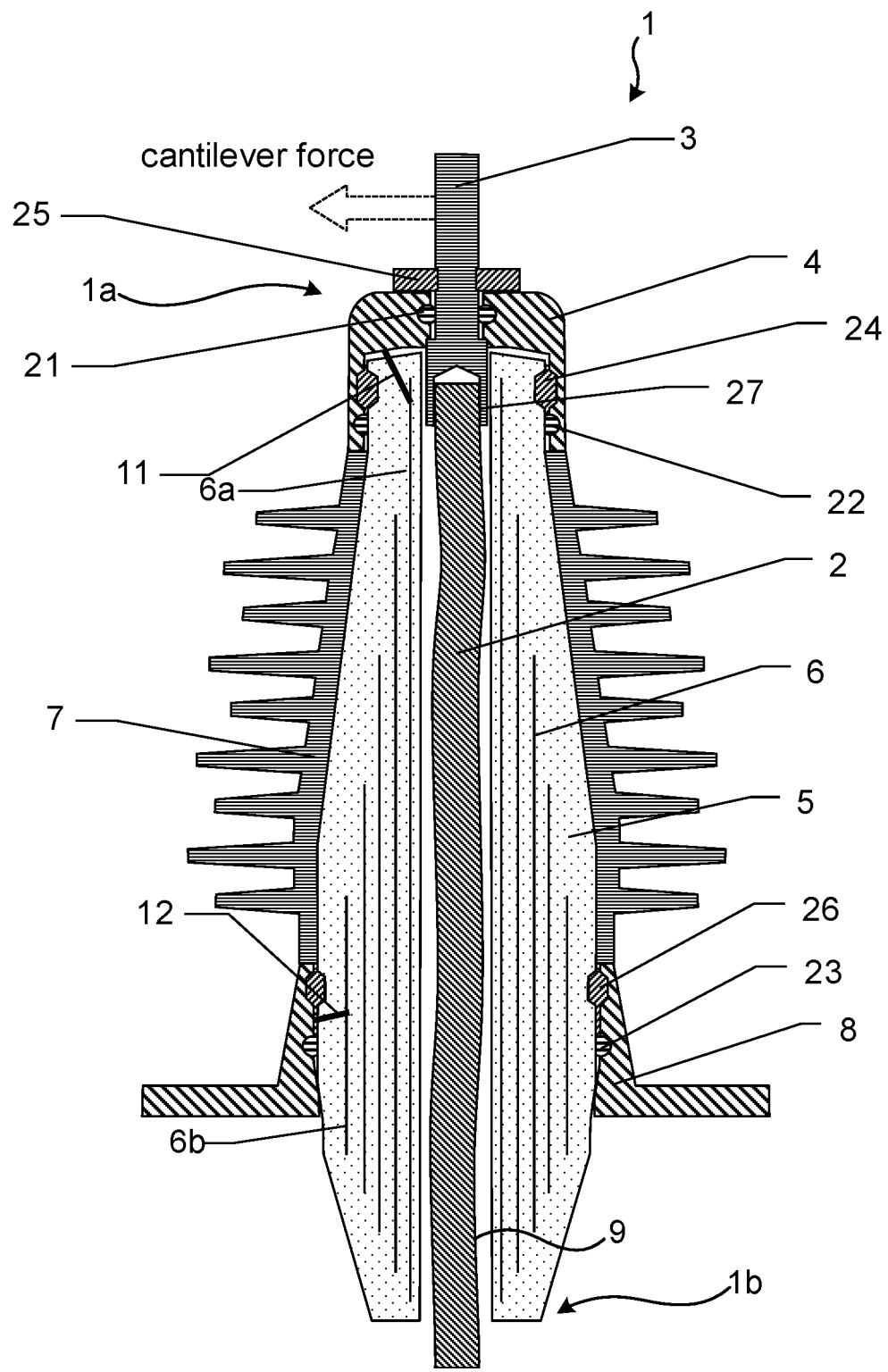
FIG. 3 is a schematic side view, in longitudinal section, of a bushing, in accordance with an embodiment of the present disclosure.

FIG. 3 illustrates an example where the conductor 3 is flexible, which is an optional alternative to other options with a rigid (solid or tubular) conductor 3.

FIG. 3 also illustrates the optional use of a clamp 25 fastened to the terminal 3 and to the top surface of the head 4, mechanically interlocking the terminal with the head. By means of the clamp 25, a cantilever force, as indicated by a dotted arrow in the figure, is transferred from the terminal 3 to the head 4, from which it is transferred to the condenser core 5, e.g. as facilitated by a head locking system 24. A head locking system 24 may be used regardless of whether a clamp 25 is used. The head locking system 24 may e.g. comprise a circumferential groove in the inner surface of the head 4 which meets a corresponding circumferential groove in the outer surface of the condenser core 5. The grooves then combine to form a circumferential cavity which may be filled with a hardenable resin, e.g. comprising epoxy or a glue. The hardened resin may then form a ring element sitting between the condenser core and the head, mechanically interlocking them. A flange locking system 26, similar to the head locking system 24, may be used at the flange 8, with the advantage of using similar materials, tools and processes at both the head and the flange.

FIG. 3 further illustrates the option of each of the conductor and head sealing systems 21 and 22 comprising O-rings in respective grooves formed in the inner surface of the head 4, one in the part of the surface facing the terminal 3 and one in the part of the surface facing the outside of the condenser core 5. Optionally, an additional sleeve element (not shown) may be used, with an outer O-ring matching the inner surface of the head 5 and an inner O-ring matching the outer surface of the terminal 3.

Figure 4:
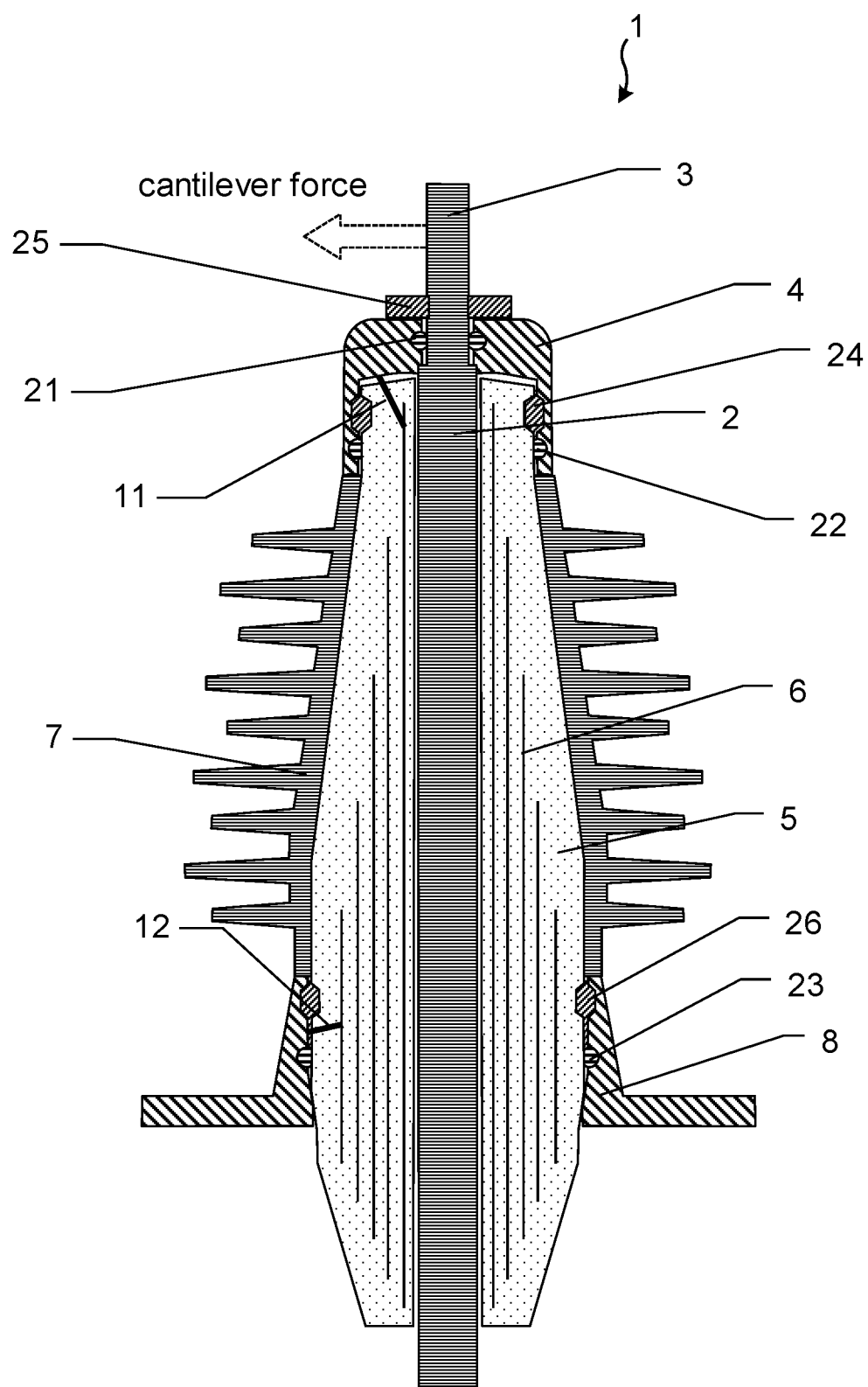
FIG. 4 is a schematic side view, in longitudinal section, of a bushing, in accordance with an embodiment of the present disclosure.

FIG. 4 illustrates a similar bushing as in FIG. 3, but with a rigid conductor 2, e.g. a solid conductor or a tubular conductor. A tubular conductor may be preferred for AC applications since the current will then be concentrated towards the outer surface of the conductor.

Figure 5:
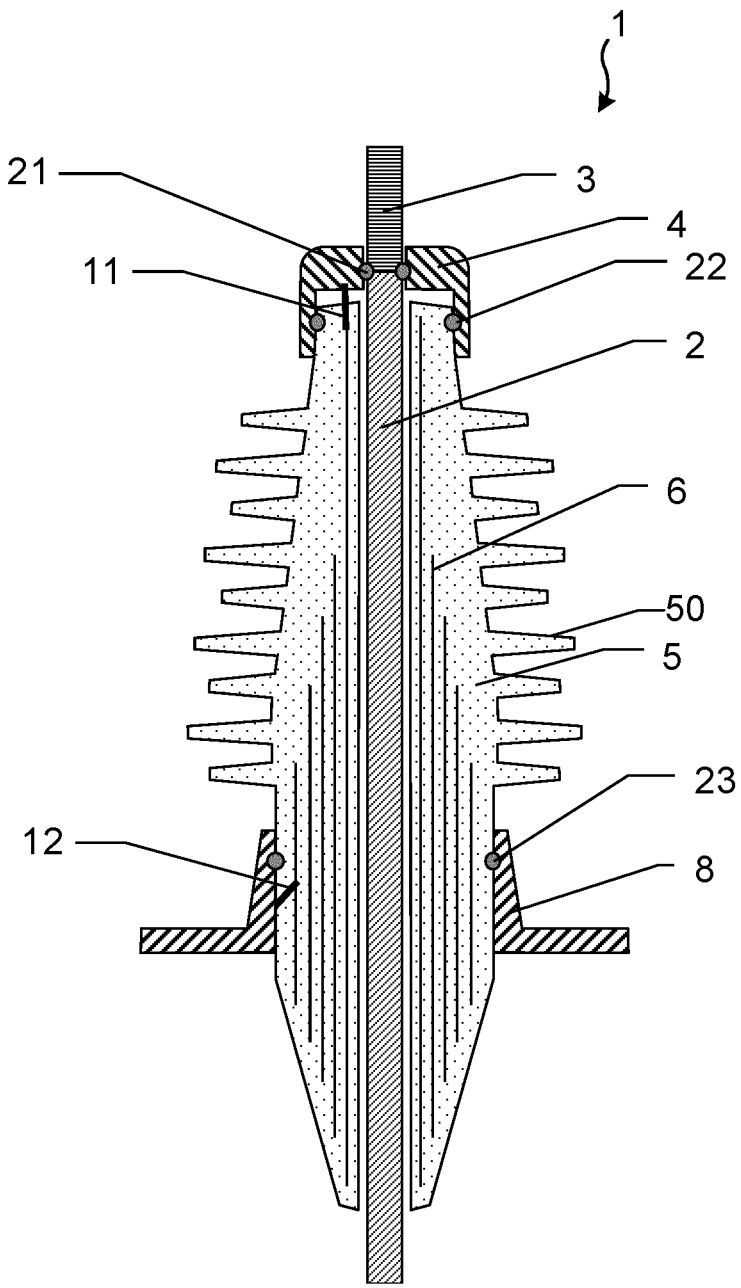
FIG. 5 is a schematic side view, in longitudinal section, of a bushing, in accordance with an embodiment of the present disclosure.

FIG. 5 illustrates an example embodiment of the bushing 1, where weather sheds 50 are made as part of the condenser core 5, obviating the need for an external insulator 7. The thus integrated weather sheds 50 may be made, e.g. by means of an additive manufacturing technique, of a resin which may be the same or similar as the resin used in the rest of the condenser core, e.g. comprising or consisting of epoxy, in particular weatherproof cycloaliphatic and/or hydrophobic epoxy.

Figure 6:
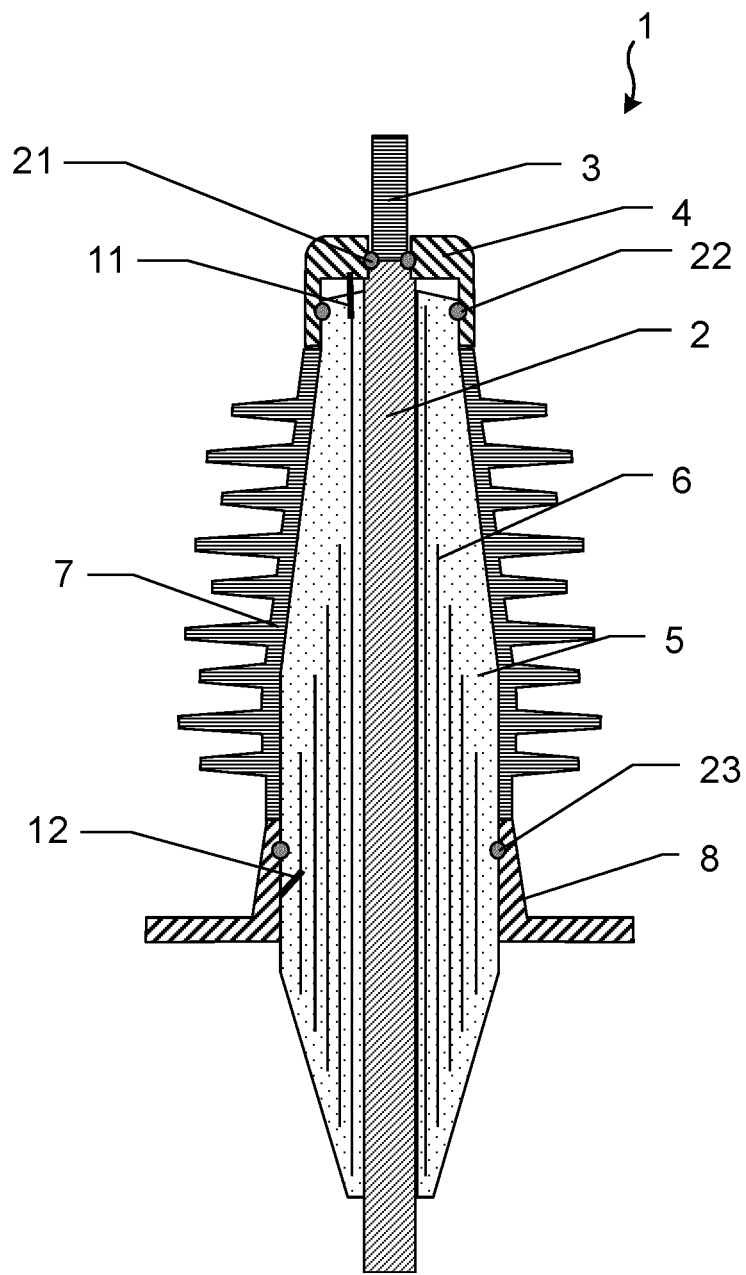
FIG. 6 is a schematic side view, in longitudinal section, of a bushing, in accordance with an embodiment of the present disclosure.

FIG. 6 illustrates an example embodiment of the bushing 1, where the conductor 2 is not removable but fixed to the condenser core 5. The condenser core may for instance be manufactured by winding and/or casting directly on the conductor, like in the RIP or RIS processes, or by depositing insulating material over the conductor, e.g. by means of an additive manufacturing technique. Alternatively, a layer of stress-releasing compressible material may in some embodiments be included between the outer surface of the conductor and the condenser core.

Figure 7:
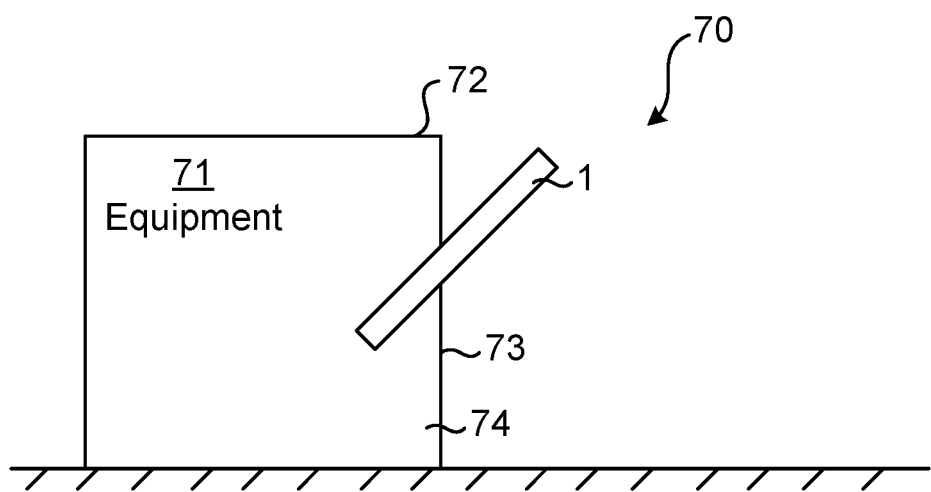
FIG. 7 is a schematic sectional side view of an electrical assembly, in accordance with some embodiments of the present disclosure.

FIG. 7 illustrates an electrical assembly 70 comprising an embodiment of the bushing 1 of the present disclosure arranged through a wall 73 of a housing 72 of an electrical equipment 71 e.g. a high-voltage (HV) equipment such as a transformer, motor, switchgear, generator or reactor. For instance, the electrical equipment 71 may be a transformer, typically a HV transformer, having a housing 72 in the form of a transformer tank. The electrical equipment 71 may be filled with an electrically insulating fluid 74, e.g. a liquid such as an oil (typically mineral oil) or ester liquid, or by a gas such as $SF_6$.

In some embodiments of the present disclosure, the condenser core 5 is unconstrained at the second end 1b of the bushing 1. Thus, the condenser core 5 is allowed to expand or contract, e.g. during curing or uptake of insulation fluid, preventing the formation of mechanical stress and even cracks in the condenser core.

In some embodiments of the present disclosure, the second end 1b of the bushing 1 is open to enable electrically insulating fluid to enter the central longitudinal through-hole 9. Thus, insulation fluid of the electrical equipment to which the bushing is mounted is allowed to enter the bushing, facilitating the mounting of the bushing to the electrical equipment since the second end 1b does not have to be closed from the inside of the housing of the electrical equipment.

In some embodiments of the present disclosure, the head 4 is sealingly engaging the circumferential lateral outer surface of the condenser core 5 by means of a head sealing system 22. The head sealing system 22 may e.g. comprise at least one O-ring. However, other sealing elements may additionally or alternatively be comprised in the head sealing system 22. Alternatively, the head 4 may be pressed tightly onto the condenser core 5 without the need for a head sealing system.

In some embodiments of the present disclosure, the head 4 is sealingly engaging the conductor 2 by means of a conductor sealing system 21. The conductor sealing system 21 may e.g. comprise at least one O-ring. However, other sealing elements may additionally or alternatively be comprised in the conductor sealing system 21. Alternatively, the head 4 may be pressed tightly onto/around the conductor 2 without the need for a conductor sealing system.

In some embodiments of the present disclosure, the condenser core 5 comprises a hardened, e.g. cured, resin. The resin may be or comprise an epoxy resin or a phenolic resin, preferably an epoxy resin. Alternatively, the condenser core may be cellulose-based, typically comprising wound cellulose (paper) layers.

In some embodiments of the present disclosure, the conductor 2 directly interfaces with the condenser core 5, possibly over a fluid-filled gap, without an intermediate winding tube or conductor insulation. By there not being an electrically conducting winding tube or the like, there is no need to fix the conductor concentrically within the through hole 9, reducing the complexity of the bushing. Similarly, in some embodiments, the condenser core 5 may be formed in contact with the conductor 2. Thus, the condenser core may have been formed, e.g. printed or wound, directly onto and around the conductor. Alternatively, the condenser core 5 may comprise an electrically insulating tube defining the central longitudinal through-hole 9, e.g. a winding tube onto which the condenser core may be formed, such as wound or printed, made from an electrically insulating material, allowing the conductor 2 to be removable. The electrically insulating material of such an electrically insulating tube may comprise reinforcing fibres, e.g. glass-fibre and/or polymer-fibre, typically forming a composite in a resin matrix e.g. comprising epoxy and/or phenolic resin, e.g. a glass-fibre or polymer fibre epoxy composite, preferably a glass-fibre epoxy composite.

In some embodiments of the present disclosure, the condenser core 5 is formed with integrated weather sheds 50. Integrated weather sheds may reduce the complexity of the bushing 1 and may e.g. be printed of a curable or otherwise hardenable resin such as comprising or consisting of epoxy and/or phenolic resin, preferably epoxy resin.

In some embodiments of the present disclosure, the bushing 1 is mounted through a wall of a housing of an electrical equipment, forming an electrical assembly.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A bushing having a first end and a second end, comprising:
   an electrical conductor comprising a terminal at the first end of the bushing;
   an electrically insulating condenser core arranged around the conductor and defining a central longitudinal through-hole through which the conductor extends;
   a plurality of concentric field-grading layers arranged in the condenser core, comprising an inner field-grading layer and an outer field-grading layer;
   an electrically conductive head electrically connected with the conductor passing entirely there through, forming a gas-tight cap of the first end of the bushing outside of the condenser core, sealingly engaging a circumferential lateral outer surface of the condenser core and sealingly engaging the conductor; and
   an electrically conductive connection between the inner field-grading layer and the head, wherein the second end of the bushing is open to enable electrically insulating fluid to enter the central longitudinal through-hole.

2. The bushing of claim 1, wherein the condenser core is unconstrained at the second end of the bushing.

3. The bushing of claim 1, wherein the head is sealingly engaging the circumferential lateral outer surface of the condenser core by means of a head sealing system comprising at least one O-ring.

4. The bushing of claim 1, wherein the head is sealingly engaging the conductor by means of a conductor sealing system comprising at least one O-ring.

5. The bushing of claim 1, wherein the condenser core comprises a cured resin comprising an epoxy resin.

6. The bushing of claim 1, wherein the conductor directly interfaces with the condenser core, possibly over a fluid-filled gap, without an intermediate winding tube or conductor insulation.

7. The bushing of claim 1, wherein the condenser core is formed in contact with the conductor.

8. The bushing of claim 1, wherein the condenser core comprises an electrically insulating tube defining the central longitudinal through-hole.

9. The bushing of claim 8, wherein the electrically insulating tube comprises reinforcing fibres, comprising a glass-fibre and/or polymer fibre epoxy composite.

10. The bushing of claim 1, wherein the condenser core is formed with integrated weather sheds.

\* \* \* \* \*